3,367,134
PURGE ARRANGEMENT FOR ABSORPTION REFRIGERATION SYSTEMS

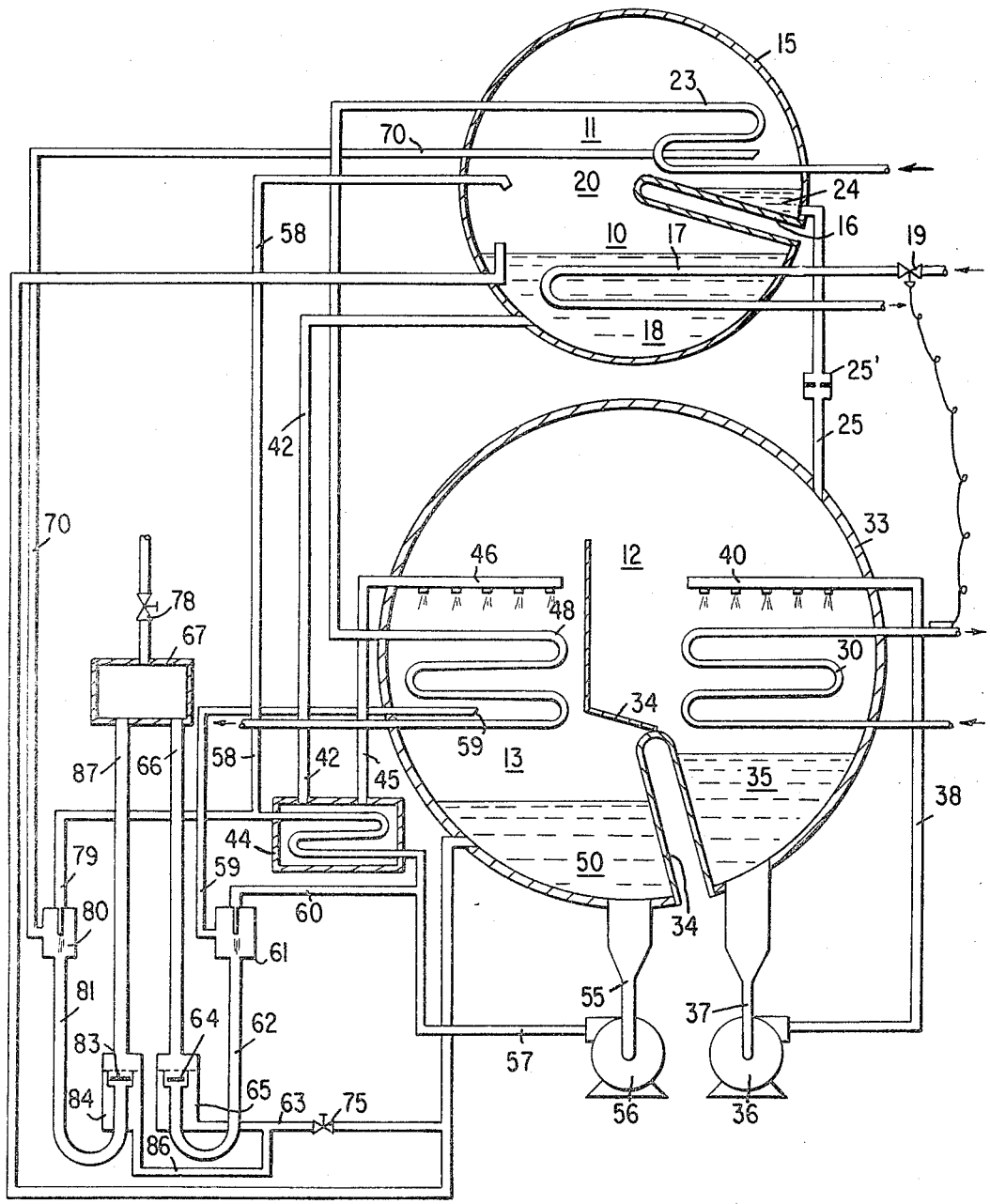

Joseph R. Bourne, Dewitt, N.Y., assignor to Carrier Corporation, Syracuse, N.Y., a corporation of Delaware
Filed Aug. 30, 1966, Ser. No. 576,036
2 Claims. (Cl. 62—475)

This invention relates to absorption refrigeration systems and, more particularly, to a purge arrangement for removing noncondensible gases from absorption refrigeration systems.

A substantial amount of the noncondensible gases created within an absorption refrigeration system arises in the generator section of that system. The noncondensible gases pass into the system condenser section, are expanded into the evaporator section, and then pass to the absorber section where they are removed by the system purge arrangement. It is desirable that these noncondensible gases be removed from the system as early as possible and preferably before entry into the system evaporator and absorber sections.

It is a principal object of the present invention to provide an absorption refrigeration system incorporating a mechanism for purging noncondensible gases from the condenser section of the system.

It is an object of the present invention to provide an absorption refrigeration system having a dual purge arrangement adapted to remove noncondensible gases both from the system condenser section and absorber section.

This invention relates to an absorption refrigeration system comprising a generator section, a condenser section, an evaporator section, and an absorber section, the absorber section having a sump within which relatively weak solution is adapted to collect; a purge line opening into the condenser section; a chamber for storing noncondensible gases; pump means for passing solution in the absorber section to the generator section; a conduit connecting the discharge side of the pump means with the purge line to divert a portion of the solution discharging from the pump means to the purge line, the conduit opening into the purge line to emit a stream of solution into the purge line to draw noncondensible gases from the condenser section into the purge line and entrainment with the solution stream, the solution serving to absorb refrigerant accompanying noncondensible gases drawn through the purge line; means for separating noncondensible gases from the entraining solution; a line for returning separated solution from the separating means to the system; and a gas conduit for conducting noncondensible gases from the separating means to the storage chamber for exhaust into the atmosphere.

Other objects and advantages of this invention will be apparent from the ensuing description and drawing in which the figure is a diagrammatic view of an absorption refrigeration system incorporating the purge arrangement of the present invention.

The absorption refrigeration system of the present invention preferably employs water as the refrigerant and a solution of lithium bromide as the absorbent. It is understood that other refrigerants and absorbents may be used. As used herein, the term "strong solution" refers to a concentrated solution of lithium bromide which is strong in absorbing power; the term "weak solution" refers to a dilute solution of lithium bromide which is weak in absorbing power.

Referring to the attached drawing, there is shown an absorption refrigeration system including a generator section 10, a condenser section 11, an evaporator section 12 and an absorber section 13 interconnected to provide refrigeration.

Generator and condenser sections 10, 11 respectively are encased in a common shell or housing 15 separated by inwardly projecting baffle 16. Generator section 10 has heat exchange tubes 17 passing therethrough. Tubes 17 communicate with a suitable heating medium i.e. steam. Control valve 19 regulates flow of heating medium through heat exchange tubes 17 of generator section 10 in accordance with the load imposed on the system. Weak solution is heated in generator section 10 to boil off refrigerant vapor thereby concentrating the weak solution in sump 18 of generator section 10. Vaporous refrigerant rises upwardly through the space 20 between shell 15 and baffle 16 into condenser section 11 thereabove.

Condenser section 11 includes a plurality of heat exchange tubes 23 through which any suitable cooling medium such as water is passed. Refrigerant vapor from generator section 10 is condensed to liquid refrigerant by cooling medium passing through tubes 23, liquid refrigerant accumulating in sump 24 from whence it passes through condensate line 25 and flow control orifice 25' to evaporator section 12.

Evaporator and absorber sections 12, 13, respectively, are encased in common shell or housing 33 preferably disposed below shell 15. Partition 34 separates evaporator section 12 from absorber section 13. Evaporator section 12 comprises plural heat exchange tubes 30 disposed in a tube bundle located in a region of shell 33. Liquid refrigerant discharged from condensate line 25 accumulates in sump 35 of evaporator section 12. Refrigerant recirculation pump 36 draws refrigerant from evaporator section sump 35 through line 37, pump 36 discharging refrigerant through line 38 and nozzles 40 over the heat exchange tubes 30 of evaporator section 12.

Water or other heat exchange fluid to be cooled passing through tubes 30 is cooled by the refrigerant discharged over exterior surfaces of the tubes by nozzles 40. Heat absorbed by the refrigerant vaporizes the refrigerant on the exterior surfaces of the tubes. The vaporized refrigerant passes from evaporator section 12 into absorber section 13 carrying with it the heat absorbed from the water in tubes 30. The chilled water may be circulated to a place of use as desired.

Strong solution from sump 18 of generator section 10 flows through strong solution line 42 to heat exchanger 44 where it is placed in heat exchange relation with weak solution returning to generator section 10. Strong solution leaving heat exchanger 44 passes through line 45 to spray nozzles 46 in absorber 13 which distribute the strong solution over heat exchange tubes 48 to wet absorber tubes 48.

Cooling water or other suitable cooling medium is passed through tubes 48 to cool the absorbent solution sprayed on the exterior surfaces of tubes 48. The cooling medium may comprise fluid leaving tubes 23 of condenser section 11, the fluid passing through tubes 48 of absorber section 13 prior to discharge thereof.

Absorbent solution from absorber section sump 50 flows through weak solution line 55 to pump 56. Weak solution from pump 56 passes through line 57, heat exchanger 44, and line 58 into generator section 10 for reconcentration. Absorber section purge line 59 opens adjacent the lower portion of the tube bundle in absorber section 13.

To effectuate purging action of line 59, solution is taken from the discharge side of pump 56 through line 60 and discharged through chamber 61 into fall tube 62. Purge line 59 opens into chamber 61. The stream of liquid solution emitted from line 60 and falling through chamber 61 draws noncondensible gases from absorber section 13 through purge line 59 into entrainment therewith.

Solution with noncondensible gases entrained therewithin in fall tube 62 passes through check valve 64 into separator 65. Check valve 64 prevents return flow of either solution or noncondensible gases from separator 65 into fall tube 62. Separator 65 divides the lighter, less dense non-condensible gases from the heavier, more dense motive solution. The separated solution is returned to the absorber section sump 50 by means of line 63. Noncondensible gases from separator 65 rise through line 66 into storage chamber 67.

A second purge line 70 opens into condenser section 11 adjacent the upper portion of shell 15. To effectuate purging action of line 70 and reduce thermodynamic loss, solution is preferably drawn from the discharge side of heat exchanger 44 through line 79 and discharged through chamber 80 into second fall tube 81. Purge line 70 opens into chamber 80, and line 70, chamber 80 and tube 81 form a continuous path for conveying noncondensible gases from the condenser section 11 to separator 84. The stream of liquid solution emitted from line 79 and falling through chamber 80 draws noncondensible gases from condenser section 11 through purge line 70 into entrainment therewith. If desired, solution may be drawn from line 57 upstream of heat exchanger 44.

Solution with noncondensible gases entrained therewith in fall tube 81 flows through check valve 83 into a second separation 84. Check valve 83 prevents return flow of either solution or noncondensible gases from separator 84 into fall tube 81. Separator 84 divides the lighter, less dense noncondensible gases from the heavier more dense motive solution. The separated solution is returned to the absorber section sump 50 by means of lines 86, 63 while the noncondensible gases rise through line 87 into storage chamber 67. Alternately, the separated solution from separator 84 may be returned directly to generator section 10. In this construction, suitable means (not shown) are employed to pump the solution to the level of generator section 10.

Purge line 70 opens into condenser section 11 adjacent the upper portion of shell 15. To enhance the efficiency of purge line 70, line 70 is preferably disposed in the part of condenser section 11 expected to have the lowest operating temperature, usually that portion adjacent the fluid inlet to heat exchanger tubes 23. The entraining solution stream emitted from line 79 absorbs refrigerant vapor entrained with the noncondensible gases drawn through purge line 70 and effectively separates the noncondensible gases from the refrigerant vapor.

To vent noncondensible gases accumulated in storage chamber 67, control valve 75 is closed to prevent return of solution from separators 65, 84 to the system. With the egress of solution prevented by the closure of valve 75 and by check valves 64, 83, pressures on the noncondensible gases in storage chamber 67 rise as that chamber fills with solution. Valve 78, which is opened, vents noncondensible gases to the atmosphere.

Valve 78 may be manually operated, or may comprise a pressure or solution level responsive type valve where automatic venting of the noncondensible gases is desired following closure of control valve 75. Following venting of the noncondensible gases, valve 78 is closed and valve 75 is opened to permit solution filling storage chamber 67 and lines 66, 87 to return to the system and enable purging of noncondensibles from condenser section 11 and absorber section 13 to be resumed.

Orifice 25' in condensate line 25 controls the rate of flow of liquid refrigerant from the sump 24 of condenser section 11 to evaporator section 12. Orifice 25' is sized to insure line 25 being filled with refrigerant when system loads are relatively light. With condensate line 25 sealed by refrigerant, escape of noncondensible gases from condenser section 11 through line 25 into evaporator section 12 is prevented.

Other types of flow regulating devices such as a valve may be contemplated in place of condensate line orifice 25'.

By the present construction noncondensible gases arising in generator section 10 are extracted directly from the system condenser section 11 before passage into the evaporator and absorber sections 12, 13 respectively.

While I have described a preferred embodiment of my invention, it will be understood that my invention is not limited thereto, but may be otherwise embodied within the scope of the following claims.

I claim:

1. In an absorption refrigeration system of the type having a generator section, a condenser section, an evaporator section, and an absorber section, said absorber section having a sump within which relatively weak solution is adapted to collect, the combination of: a purge line opening into said condenser section; a chamber for storing noncondensible gases; pump means for passing solution in said absorber section to said generator section; a conduit connecting the discharge side of said pump means with said purge line to divert a portion of the solution discharging from said pump means to said purge line, said conduit opening into said purge line to emit a stream of solution into said purge line to draw noncondensible gases from said condenser section into said purge line and entrainment with said solution stream, said solution serving to absorb refrigerant accompanying noncondensible gases drawn through said purge line; means communicating with said purge line and adapted to separate noncondensible gases from said entraining solution; a line for returning separated solution from said separating means to said system; and a gas conduit for conducting nonconductive gases from said separating means to said storage chamber for exhaust into the atmosphere.

2. An absorption refrigeration system according to claim 1 including a first solution line connecting the discharge side of said pump means with said generator section, said generator section including a sump within which solution is adapted to accumulate, a second solution line connecting said generator section sump with said absorber section, and means placing said solution first line in heat exchange relation with said second solution line, said conduit being connected to said first solution line and downstream of said heat exchange means.

References Cited
UNITED STATES PATENTS

| | | | |
|---|---|---|---|
| 2,703,968 | 3/1955 | Berestneff | 62—475 |
| 2,760,350 | 8/1956 | Bourne | 62—475 |
| 3,131,546 | 5/1964 | Osborne | 62—195 |

LLOYD L. KING, *Primary Examiner.*